United States Patent Office 3,310,585
Patented Mar. 21, 1967

3,310,585
PRODUCTION OF 2,3-DICHLOROTETRAFLUORO-2-CYCLOPENTEN-1-ONE
Robert J. Du Bois and Benjamin Veldhuis, both of Morris Township, Morris County, N.J., assignors to Allied Chemical Corporation, New York, N.Y., a corporation of New York
No Drawing. Filed June 5, 1964, Ser. No. 373,111
5 Claims. (Cl. 260—586)

This invention relates to 2,3-dichlorotetrafluoro-2-cyclopenten-1-one and more particularly to a new and improved process for its preparation.

2,3-dichlorotetrafluoro-2-cyclopenten-1-one having the formula:

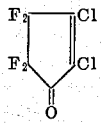

is a well known compound and has utility as an intermediate in the preparation of novel insecticidal, miticidal and herbicidal compounds as disclosed in the copending application of Gilbert and Veldhuis, Ser. No. 373,056, filed of even date. According to the prior art, it may be prepared by hydrolysis of the corresponding dimethyl ketal. Unfortunately, however, this procedure is inefficient, time consuming and uneconomical.

An object of the present invention is to provide a new and improved process for the preparation of 2,3-dichlorotetrafluoro-2-cyclopenten-1-one. Other objects and advantages will be apparent from the following detailed description.

In accordance with the present invention, 2,3-dichlorotetrafluoro-2-cyclopenten-1-one may be prepared in an efficient and economical manner by the process which comprises reacting in admixture 1,2-dichlorohexafluorocyclopentene having the formula:

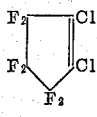

with sulfur trioxide in the presence of a boron compound catalyst in an amount of at least 0.1% by weight based on the weight of the sulfur trioxide and maintaining the admixture for a sufficient length of time to form 2,3-dichlorotetrafluoro-2-cyclopenten-1-one in the reaction medium.

We found that when sulfur trioxide was admixed with 1,2-dichlorohexafluorocyclopentene, no noticeable reaction took place even on extended periods of heating. In the course of our work we found that if we contacted 1,2-dichlorohexafluorocyclopentene with sulfur trioxide in the presence of a boron compound that a reaction occurred and that 2,3-dichlorotetrafluoro-2-cyclopenten-1-one was produced. Furthermore, we found that although a slight reaction occurred by employing trace amounts of catalyst, less than about 0.1%, based on the weight of the sulfur trioxide, the reaction was inefficient, required an inordinate amount of time, usually more than 15 hours, and consequently, was impractical from a commercial standpoint. However, if we conducted the reaction in the presence of a boron compound in an amount of at least 0.1% by weight, the reaction was completed in a short period of time, about five hours or less. Furthermore, the more boron compound we added, up to about 5%, the faster the rate of the reaction, thereby providing a fast, economical and efficient procedure for producing 2,3-dichlorotetrafluoro-2-cyclopenten-1-one.

In carrying out the process of the present invention, 1,2-dichlorohexafluorocyclopentene is admixed with sulfur trioxide in a reaction vessel which may, if desired, be equipped with stirring or agitating means. To the admixture is added an effective amount of boro compound catalyst desirably with agitation in order to provide a thorough mixing of components. Alternatively, however, the boron compound may, if desired, be predissolved in a portion of the sulfur trioxide and thereafter the mixture added to a mixture of 1,2-dichlorohexafluorocyclopentene and sulfur trioxide.

Any type of boron compound may be employed as catalyst in the reaction. Examples of boron compounds which may be employed as catalysts include: trimethoxyboroxine, borax, sodium and potassium fluoborates, methylborate, boric oxide, boric bromide, boric iodide, boric carbide, boric chloride, boric fluoride, boric hydride, boric nitride, boric silicide, boric sulfide, and preferably boric oxide. Generally, the boron compound catalysts of the present invention may be employed in an amount ranging from about 0.1 to 10% or more by weight based on the weight of the sulfur trioxide, however, optimum results have been obtained by employing an amount of catalyst within the range of about 0.1 to 5%. An amount of catalyst below about 0.1% renders the process inefficient, whereas an amount in excess of 5% produces no added advantages.

The temperature of the reaction is not critical and may be varied over a wide range such as, from about 0 to 100° C., preferably 20 to 80° C. The operation may be conveniently carried out under atmospheric conditions although super-atmospheric or sub-atmospheric pressure may be employed if desired. Although the reaction may be carried out using stoichiometric quantities of the reactants, it has been discovered that greater efficiency and higher yield of products are obtained when about 4 mols of sulfur trioxide per mol of 1,2-dichlorohexafluorocyclopentene are employed. The employment of molar ratios substantially below about 4 mols of sulfur trioxide per mol of 1,2-dichlorohexafluorocyclopentene results in an increase in the percentage of unreacted 1,2-dichlorohexafluorocyclopentene, whereas an amount of sulfur trioxide in excess of about 6 mols produces no added advantages.

The crude product is homogeneous and appears in the reaction medium as an oily liquid and may be separated by adding to the reaction medium a sufficient quantity of solvent such as water, in which the impurities, but not the product are soluble. Water is particularly desirable as the solvent not only because of its availability, but because of the excellent results obtained. After separation of the impurities, the remaining insoluble oily liquid is thereafter subjected to a distillation procedure to recover 2,3-dichlorotetrafluoro-2-cyclopenten-1-one.

The following examples illustrate the invention:

Example I

About 690 grams of 1,2-dichlorohexafluorocyclopentene and 922 grams of sulfur trioxide were admixed and refluxed for one hour at a pot temperature of about 45.9 to 49.5° C. One gram of boric oxide was then added and refluxed for 3½ hours, the pot temperature gradually rising to 65° C. The reaction mixture, after standing overnight, was mixed with 1000 ml. water with cooling to 60–65° C., which yielded 590 grams of water-insoluble oil product. It was distilled to give 330 grams of the desired ketone, corresponding to a 52% yield based on the 1,2-dichlorohexafluorocyclopentene.

The following example illustrates that production of 2,3-dichlorotetrafluoro-2-cyclopenten-1-one does not occur in the absence of a boron catalyst.

Example II 122.5 grams of 1,2-dichlorohexafluorocyclopentene was admixed with 160 grams of sulfur trioxide in a 250 ml. flask at a temperature of about 46° C. The mixture was refluxed for about 7½ hours. There was no rise in temperature and no reaction occurred over the 7½ hour period.

Although certain preferred embodiments of the invention have been disclosed for purpose of illustration, it will be evident that various changes and modifications may be made therein without departing from the scope and spirit of the invention.

We claim:

1. A process for the preparation of 2,3-dichlorotetrafluoro-2-cyclopenten-1-one which comprises reacting in admixture 1,2-dichlorohexafluorocyclopentene with sulfur trioxide in the presence of a boron compound catalyst selected from the group consisting of trimethoxyboroxine, borax, sodium and potassium fluoborates, methylborate, boric oxide, boric bromide, boric iodide, boric carbide, boric chloride, boric fluoride, boric hydride, boric nitride, boric silicide and boric sulfide in an amount of at least 0.1% by weight and maintaining the admixture for a sufficient length of time to form 1,2-dichlorotetrafluorocyclopentenone-3 in the reaction medium.

2. The process of claim 1 wherein the boron compound catalyst is present in an amount of from about 0.1 to 10% by weight based on the weight of the sulfur trioxide.

3. The process of claim 1 wherein the boron compound catalyst is boric oxide.

4. A process for the preparation of 2,3-dichlorotetrafluoro-2-cyclopenten-1-one which comprises reacting in admixture 1,2-dichlorohexafluorocyclopentene with sulfur trioxide in the presence of boric oxide in an amount of from about 0.1 to 5% by weight based on the weight of the sulfur trioxide and maintaining the admixture for a sufficient length of time to form 2,3-dichlorotetrafluoro-2-cyclopenten-1-one in the reaction medium.

5. A process for the preparation of 2,3-dichlorotetrafluoro-2-cyclopenten-1-one which comprises reacting in admixture 1,2-dichlorohexafluorocyclopentene with sulfur trioxide in a molar ratio of about 1 mol of 1,2-dichlorohexafluorocyclopentene to 4 mols of sulfur trioxide in the presence of boric oxide in an amount of about 0.1 to 5% by weight based on the weight of the sulfur trioxide and maintaining the admixture for a sufficient length of time to form 2,3-dichlorotetrafluoro-2-cyclopenten-1-one, treating the reaction medium with water to separate impurities therefrom and thereafter recovering 2,3-dichlorotetrafluoro-2-cyclopenten-1-one from the reaction medium.

References Cited by the Examiner

Newcomer et al., "J. Am. Chem. Soc." vol. 71, pp. 949 and 950 (1949).

LEON ZITVER, *Primary Examiner.*

M. JACOB, *Assistant Examiner.*